United States Patent Office 2,875,901
Patented Mar. 3, 1959

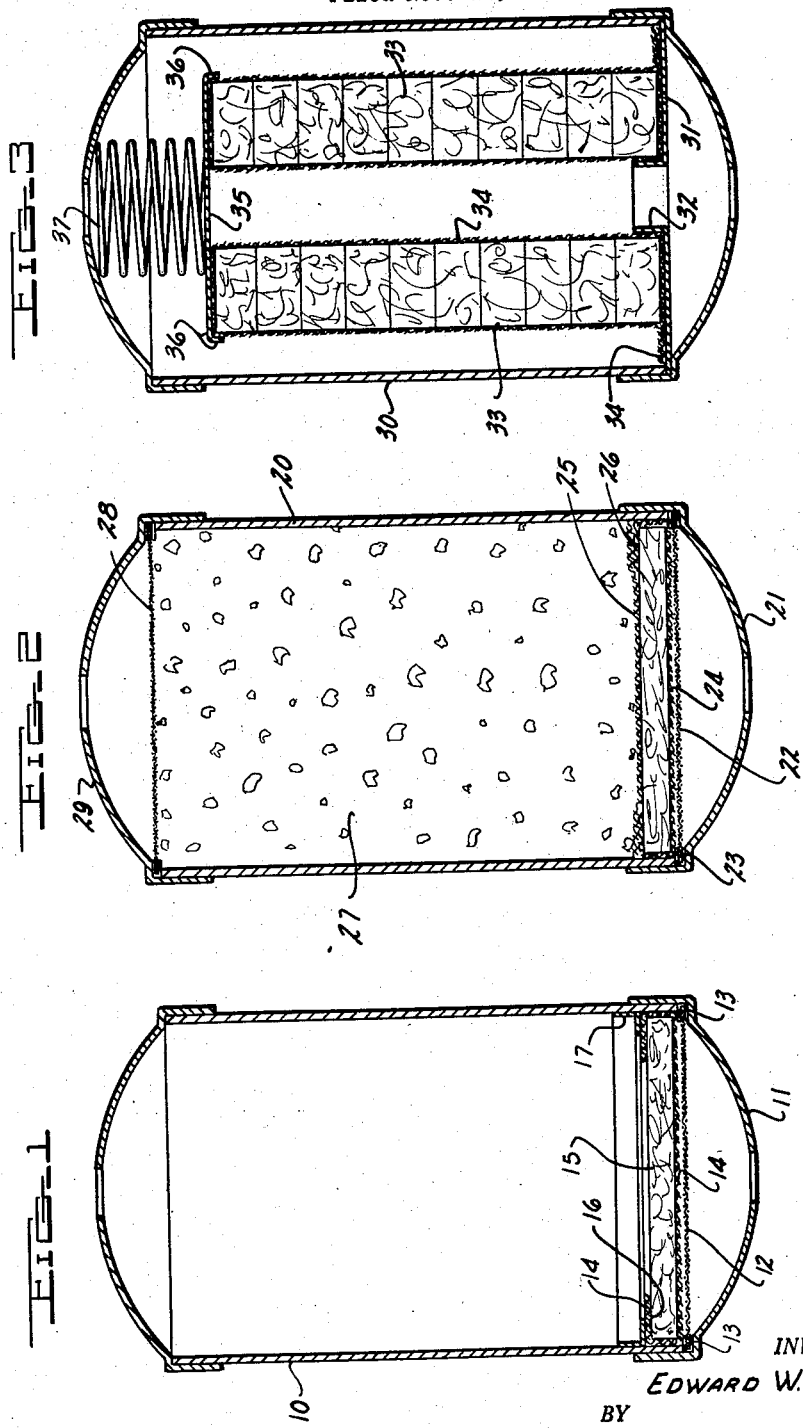

2,875,901

FILTER

Edward W. Bottum, Detroit, Mich.

Application November 26, 1954, Serial No. 471,155

3 Claims. (Cl. 210—484)

This invention relates to line filters. One of its applications is in the field of refrigeration lines. Another of its applications is as a component part of a refrigeration dehydrator.

The function of such a filter is to prevent passage of dirt or foreign matter through the filter. The filter must present certain characteristics in order to achieve its function on installation thereof and also after continued usage thereof.

One characteristic which might be mentioned is that the pores or passages in the filter must be small enough to prevent the transmission of relatively small particles of dirt or foreign matter without creating an undesirable back-pressure on the fluid in the line.

Another desired characteristic is that the filter must be of sufficient depth or capacity to prevent dirt particles from covering or otherwise plugging up the pores therein after extended periods of use.

Another characteristic which is important in filter construction is that the fibers, granules, or strands which make up the filtering medium be so related to each other that pressure drop through the filter is not excessive.

It is desirable from a maintenance standpoint that the materials which make up the filter be of sufficient strength that the filter retains its initial form after extended periods of use. Ability of the filter to retain its initial form results in reducing the number of filter changes which are required.

In certain installations it is necessary that a filter be capable of resisting corrosive forces encountered during the passage of corrosive materials through the filter.

In some instances the filter must be capable of withstanding the effects of high temperatures encountered during the filtering operation.

Various materials have been suggested as suitable for filtering media. Among these various materials may be mentioned mineral wool, glass wool, granular bronze, sintered porous metal, wire cloth and organic felts.

Mineral wool and glass wool, insofar as their applications in the filtration field are concerned, are subject to the defect that they present filtering media which are heterogeneous and of such rigidity that after a period of use dirt-passing channels are formed therein.

Granular bronze or sintered porous metal is considered deficient as a filtering material in that the passages or pores between granules are relatively very small compared to the size of the granules. This means that the "free" or open area is very small causing the filter to plug quite readily.

Wire cloth, when employed as a filtering medium does not give the depth or capacity which is generally required.

Organic felts, when employed as filtering media, are defective because they deteriorate on exposure to the elevated temperatures which are sometimes encountered.

Products have been developed for use as filtering media which satisfy to a remarkable degree the above-noted requirements for high capacity, low pressure drop, sufficient rigidity to retain their original forms, corrosion resistance, and resistance to high temperatures. These products are formed by sintering and subsequently pressing various inorganic fibers.

Among the fibers which have been employed are glass wool fibers and mineral wool fibers.

The product which obtains from the sintering and pressing operations is admirably suited for use as a filtering medium and is of such character that the fibers thereof are rigidly positioned at the desired intervals, whereby no channels can be formed through which any unfiltered material could pass.

In utilizing the product as a filtering medium it may be formed into blocks or disks as desired to fit the tube or shell within which it is to be positioned during the period when it is to perform its filtering function.

A problem which has been encountered in using these sintered fiber filtering blocks is that of resistance to shock or fracturing forces.

It is an object of this invention to incorporate a sintered fiber block as a filtering medium in a tube or shell in such manner that resistance of said block to fracturing forces will be enhanced.

More specifically it is an object of this invention to devise a filter wherein there is employed a sintered fiber block in combination with a resilient element for isolating the sintered fiber block from fracturing forces, thereby preserving the filtering characteristics of the filter even after extended periods of use.

In achieving the above-mentioned objects there is employed a sintered fiber block in combination with a resilient cloth. The cloth is made of sufficient dimension that it may envelop or encircle the block and thereby isolate said block from any fracturing forces which may be set up between it and the shell in which it is positioned. One cloth which has been found to possess the desired resilience is glass cloth.

Other objects of this invention will appear in the following description and appended claims, reference being had to the accompanying drawings forming a part of this specification wherein like reference characters designate corresponding parts in the several views.

In the drawings:

Fig. 1 is a cross sectional view taken through a shell or tube wherein there is positioned one embodiment of a filter constructed according to the present invention.

Fig. 2 is a cross sectional view showing another embodiment of the invention.

Fig. 3 is a cross sectional view showing still another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Fig. 1 there is shown a shell 10 having a cap 11 secured at one end thereof. Between the end of the shell and interior face of the cap there is positioned a wire screen 12, having a peripheral binding 13. If desired a perforated metal plate could be used in place of the wire screen.

Positioned in facial engagement with screen 12 is a glass cloth 14 having its peripheral portions extended up around the peripheral edge of sintered fiber filter block 15 and preferably although not necessarily into overlying relationship with facial portions 16 of said block. A retainer bracket or ring 17 is provided for locking cloth 14 and filter block 15 in their illustrated positions.

Screen 12 functions merely as a support for cloth 14 and block 15. Block 15 acts as the filtering medium. Cloth 14 has an inherent resiliency which allows it to act as a cushion for absorbing any forces which might be transmitted to block 15 from shell 10, cap 11, screen 13 or retainer bracket 17. In this connection it will be observed that cloth 14 completely encircles block 15, whereby said block is prevented from making direct contact with either shell 10, cap 11, screen 13 or retainer bracket 17.

Referring to Fig. 2 there is shown a shell 20 having a cap 21 secured at one end thereof. As with the embodiment shown in Fig. 1 there is provided a wire screen 22 having a binding 23 and a resilient glass cloth 24. Cloth 24 has its peripheral portions extended up and over the peripheral edge portions of sintered fiber filter block 25. In addition to cloth 24 there is provided a second glass cloth 26 in facial engagement with block 25 and serving as a cushion for desiccant 27. This desiccant may be of various materials, examples thereof being silica gel and activated alumina. It has been found that glass cloth 26 has a sufficient resilience to prevent the desiccant from "shaking" or otherwise forming channels through which an undesired fluid flow might take place. The desiccant is held within shell 20 by a wire screen 28 positioned between said shell and a cap 29.

The embodiment shown in Fig. 3 includes a shell 30, at one end of which is positioned an annular plate 31 provided with an endless upstanding flange 32. A sintered fiber filter block in the form of a series of rings 33 is mounted on plate 31. If desired, the filter block could be made as a long hollow cylinder instead of the series of rings shown in Fig. 3. As with previous embodiments a resilient glass cloth encircles the filter block. In this case the glass cloth takes the shape or form of an annular sleeve 34. At one end of the filter block there is positioned a circular plate 35 having a peripheral flange 36 for retaining the filter block in its illustrated position. A compression coil spring 37 is provided for biasing plate 35 toward the filter block. It will be noted that resilient glass cloth 34 completely envelops the filter block and thereby isolates it from plates 31 and 35, between which it is positioned.

From the foregoing description, taken in conjunction with the accompanying drawings it will be appreciated that each embodiment of the invention envisages a filter construction wherein the filtering element takes the form of a sintered fiber block which provides for high filtration capacity, low pressure drop, high rigidity, good corrosion resistance, and good resistance to high temperatures. A resilient cloth element is preferably employed for effectively isolating the filtering element from fracturing forces.

Having described my invention, I claim:

1. In a filter construction the combination comprising; a shell; a filter block comprised of sintered glass fibers positioned within the shell; and a glass cloth positioned between the filter block and shell to provide a resilient cushion for the filter block.

2. In a filter construction the combination comprising; a shell; a filter block comprised of sintered fibers positioned within the shell; a desiccant within the shell; a resilient cloth isolating the filter block from the shell; and a resilient pad isolating the desiccant from the filter block.

3. In a filter construction the combination comprising; a shell; a filter block comprised of sintered glass fibers and positioned within the shell; and a glass cloth envelope encircling said filter block to provide a resilient cushion therefor.

References Cited in the file of this patent

UNITED STATES PATENTS

| Number | Name | Date |
|---|---|---|
| 1,193,334 | Acheson | Aug. 1, 1916 |
| 1,557,117 | Sweeney | Oct. 13, 1925 |
| 1,626,055 | Tannehill | Apr. 26, 1927 |
| 1,678,770 | Eisenhauer | July 31, 1928 |
| 1,704,847 | Struck | Mar. 12, 1929 |
| 2,148,708 | Orr | Feb. 28, 1939 |
| 2,283,989 | Henry | May 26, 1942 |
| 2,388,668 | Carter | Nov. 13, 1945 |
| 2,556,292 | Newcum | June 12, 1951 |
| 2,583,812 | Briggs et al. | Jan. 29, 1952 |
| 2,681,155 | Graham | June 15, 1954 |
| 2,692,654 | Pryor | Oct. 26, 1954 |

FOREIGN PATENTS

| Number | Country | Date |
|---|---|---|
| 460,657 | Great Britain | Feb. 2, 1937 |
| 707,556 | Great Britain | Apr. 21, 1954 |